US008970500B2

(12) United States Patent
Martin-Cocher et al.

(10) Patent No.: US 8,970,500 B2
(45) Date of Patent: Mar. 3, 2015

(54) SYSTEM AND METHOD FOR EXTRACTING CONTENT FROM A DATA ITEM TO SEPARATELY DISPLAY PORTIONS OF SUCH DATA

(75) Inventors: Gaelle Christine Martin-Cocher, Toronto (CA); Axel D. Ferrazzini, Brussels (BE); Suresh Chitturi, Plano, TX (US)

(73) Assignee: BlackBerry Limited, Waterloo (CA)

(*) Notice: Subject to any disclaimer, the term of this patent is extended or adjusted under 35 U.S.C. 154(b) by 1224 days.

(21) Appl. No.: 12/713,325

(22) Filed: Feb. 26, 2010

(65) Prior Publication Data

US 2011/0210907 A1 Sep. 1, 2011

(51) Int. Cl.
*G06F 3/02* (2006.01)
*G06Q 30/00* (2012.01)
*G06F 17/30* (2006.01)
*G06Q 30/02* (2012.01)

(52) U.S. Cl.
CPC .......... *G06F 17/30905* (2013.01); *G06Q 30/02* (2013.01)
USPC ......... 345/169; 345/156; 345/173; 705/14.49

(58) Field of Classification Search
CPC ......... H04L 63/08; H04L 63/20; G06F 21/31; G06F 21/60; G06F 8/315; G06F 3/011; G06F 17/30905; G06F 17/30864; G06F 17/2247; G06F 17/212; G06F 17/3082; G06F 17/30828; G06F 17/30902; G06F 21/10; G06F 17/30867; G06F 17/30899; G06F 3/04815; H04N 21/482
USPC .............. 345/1.1–1.3, 2.1–2.3, 169, 173, 156
See application file for complete search history.

(56) References Cited

U.S. PATENT DOCUMENTS

| | | | |
|---|---|---|---|
| 5,818,361 A | 10/1998 | Acevedo | |
| 7,030,837 B1 | 4/2006 | Vong et al. | |
| 7,227,511 B2 | 6/2007 | Adan et al. | |
| 7,545,342 B2 | 6/2009 | Vong et al. | |
| 8,331,991 B2 * | 12/2012 | Kim et al. | 455/566 |

(Continued)

OTHER PUBLICATIONS

Optimus Mini Three Keyboard 2.0; http://www.artlebedev.com/everything/optimus-mini/; Retrieved from Internet Dec. 30, 2009.

(Continued)

*Primary Examiner* — Duc Dinh
(74) *Attorney, Agent, or Firm* — Novak Druce Connolly Bove + Quigg LLP

(57) ABSTRACT

A system and method are provided for extracting a portion of content from a data item and separately displaying such content on a secondary display screen such as an interactive display (e.g. touch-sensitive or clickable display) that enables interactive content portions to be extracted from the data item and provided separately from the remaining content to both free up space on a primary display screen and maintain visibility of the interactive content, while permitting navigation within the remaining content. Such extraction of content is particularly advantageous for separating logos (e.g. those used for brand recognition (passive), those providing home page links (active), etc.), advertising, and M-commerce (e.g. "buy now" or "add to cart" buttons). By using interactive secondary displays, the extracted content item can target interactive content portions that allow easy access to features without having to navigate within the main content each time.

26 Claims, 12 Drawing Sheets

(56) References Cited

U.S. PATENT DOCUMENTS

| | | | |
|---|---|---|---|
| 2002/0059398 A1* | 5/2002 | Shimabukuro | 709/218 |
| 2007/0130200 A1* | 6/2007 | Ogren | 707/104.1 |
| 2008/0183582 A1 | 7/2008 | Major | |
| 2008/0235749 A1* | 9/2008 | Jain et al. | 725/114 |
| 2008/0279481 A1* | 11/2008 | Ando | 382/306 |
| 2009/0027301 A1 | 1/2009 | Mosko | |
| 2009/0088218 A1 | 4/2009 | Kim | |
| 2009/0153470 A1 | 6/2009 | Chen et al. | |
| 2009/0164930 A1* | 6/2009 | Chen et al. | 715/769 |
| 2010/0161378 A1* | 6/2010 | Josifovski et al. | 705/10 |
| 2010/0274673 A1* | 10/2010 | Isaac | 705/14.73 |

OTHER PUBLICATIONS

Barnes and Noble Nook eReader; screenshot from http://www.youtube.com/watch?v=ezILHKktf9I; Retrieved from Internet Dec. 30, 2009.

Barnes and Noble Nook eReader; screenshot from http://www.barnesandnoble.com/nook/; Retrieved from Internet Dec. 30, 2009.

Spring Design Announces Dual-Screen, Google Android-based E-book Reader, Hyperlinking Text with Multimedia; http://www.springdesign.com/resource/jsp/index.jsp; Retrieved from Internet Dec. 30, 2009.

Dual-touchscreen; http://en.wikipedia.org/wiki/Dual-touchscreen; Retrieved from Internet Dec. 30, 2009.

Stern, Joanna; "V12 Designs' Dual-Touchscreen Notebook Coming within Two Years"; Jul. 9, 2008; Blog Roll Section of http://blog.laptopmag.com/v12-designs-dual-touchscreen-notebook-coming-within-two-years; Retrieved from Internet Dec. 30, 2009.

Estari Canova; screenshot from http://www.estari.com/; Retrieved from Internet Dec. 30, 2009.

De Man, R.; Search Report from corresponding European Application No. 10154820.4; search completed Jul. 21, 2010.

Pulse Oximeter OctiveTech 300CSE-Heavy Duty; http://www.clinicalguard.com/fingerpulseoximeter300cse-p-77.html; available on the Internet as early as Feb. 3, 2009; retrieved from the Internet Mar. 25, 2010.

3 Button Optimus mini OLED Keyboard is Ready; http://www.i4u.com/article5025.html; available on the Internet as early as Feb. 1, 2006; retrieved from the Internet Mar. 25, 2010.

Example of 256 mb MP4 Video Watch http://www.tradestead.com/wholesale/mp3-players-mp4-players/mp4-watches/256mb-mp4-watches/mp4-videowatch-p-1067.html;—no longer available online; Available at least on Dec. 8, 2009.

Office Action mailed Jul. 28, 2014; in corresponding Canadian patent application No. 2,731,141.

\* cited by examiner

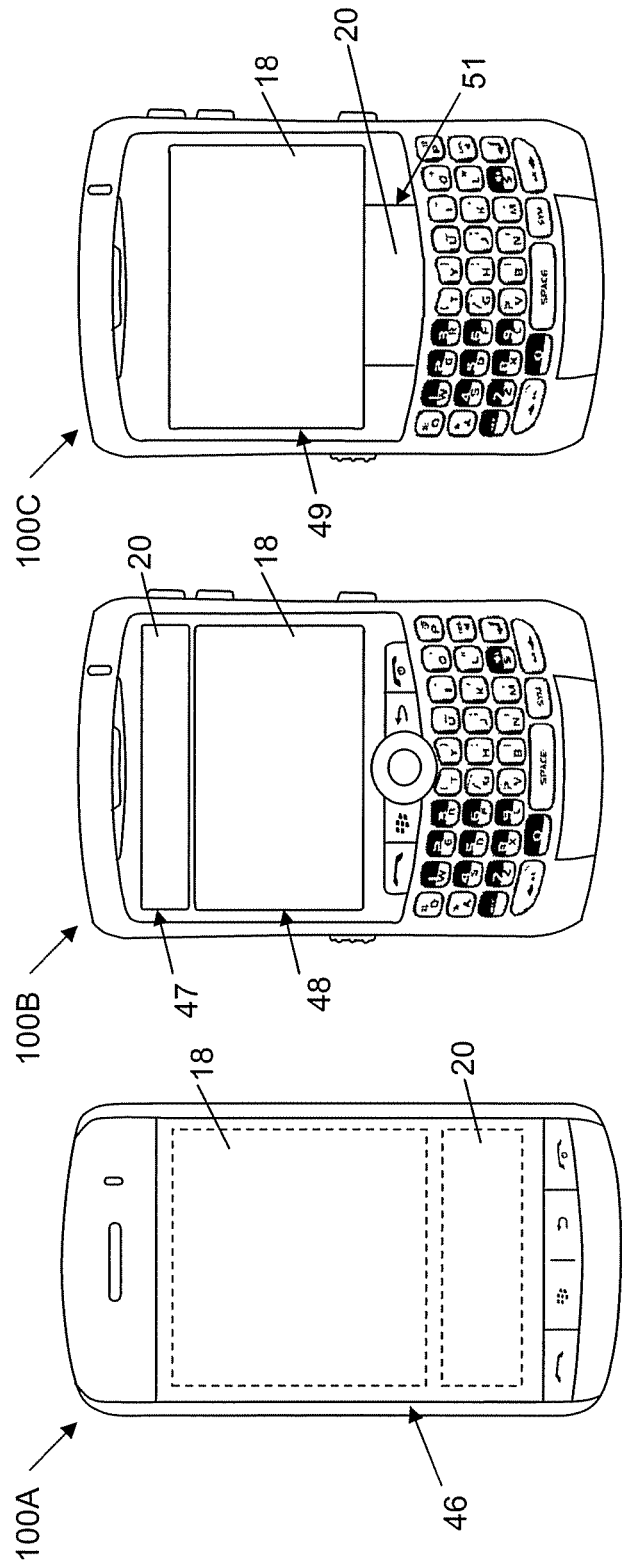

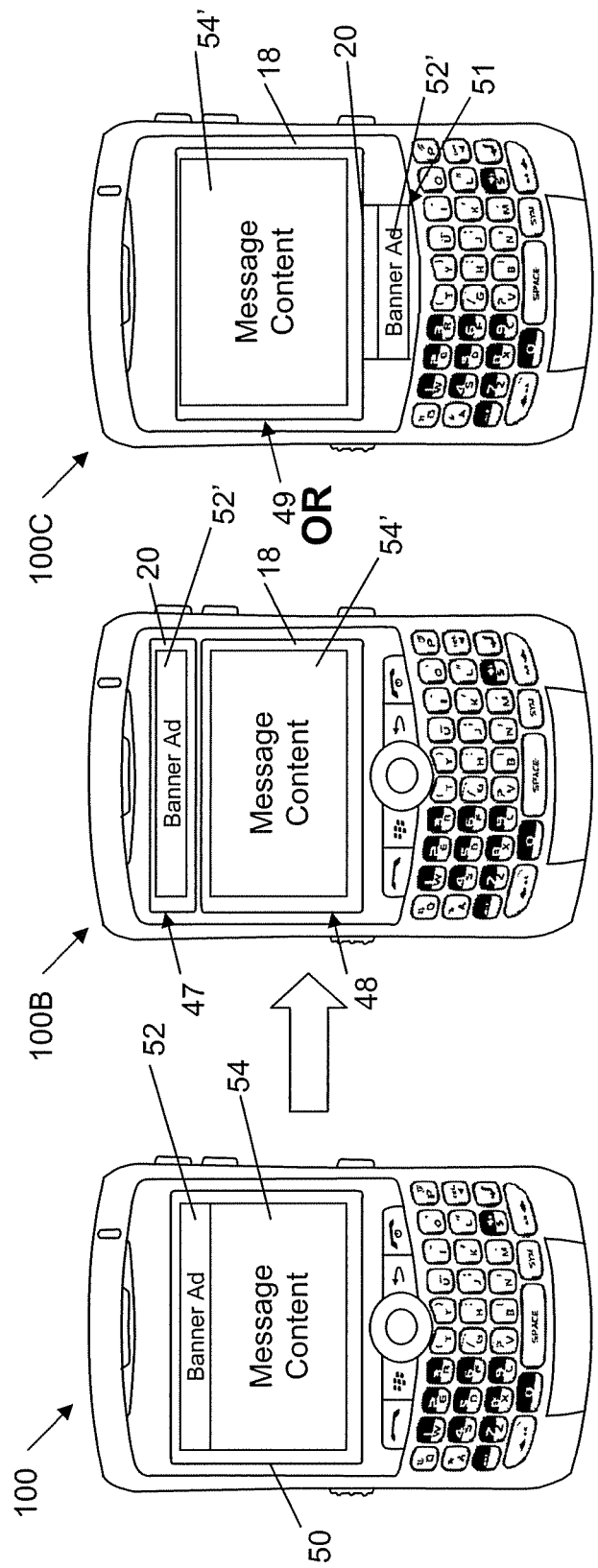

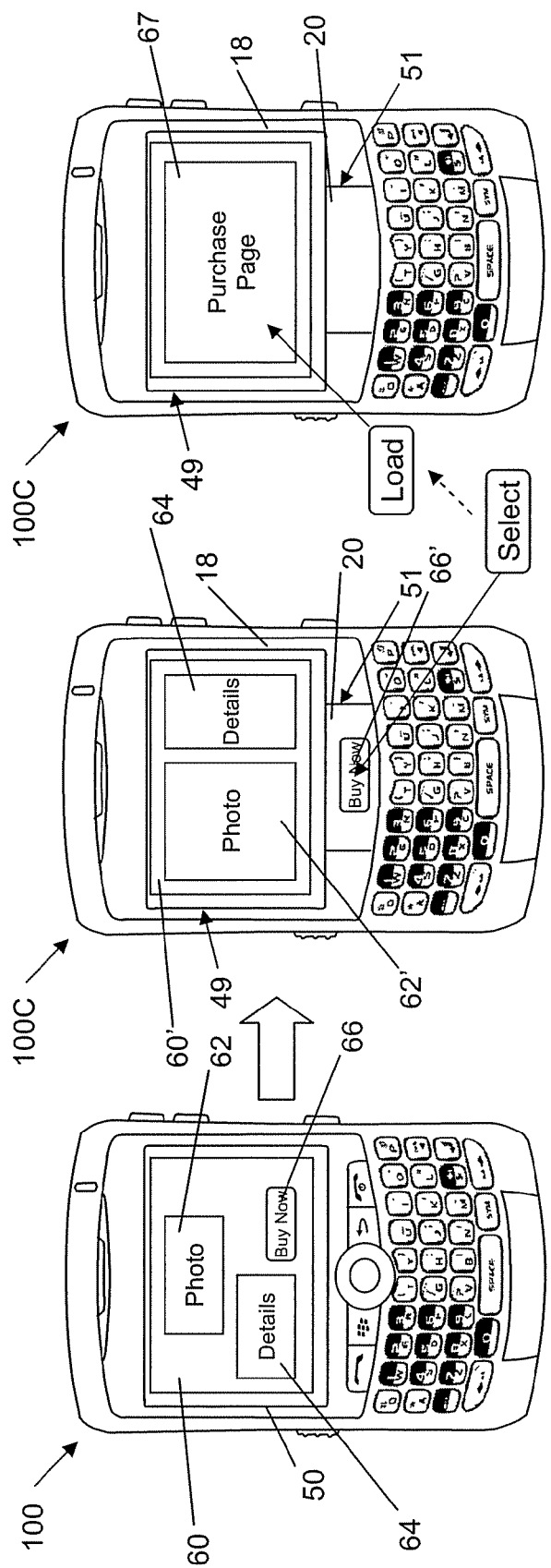

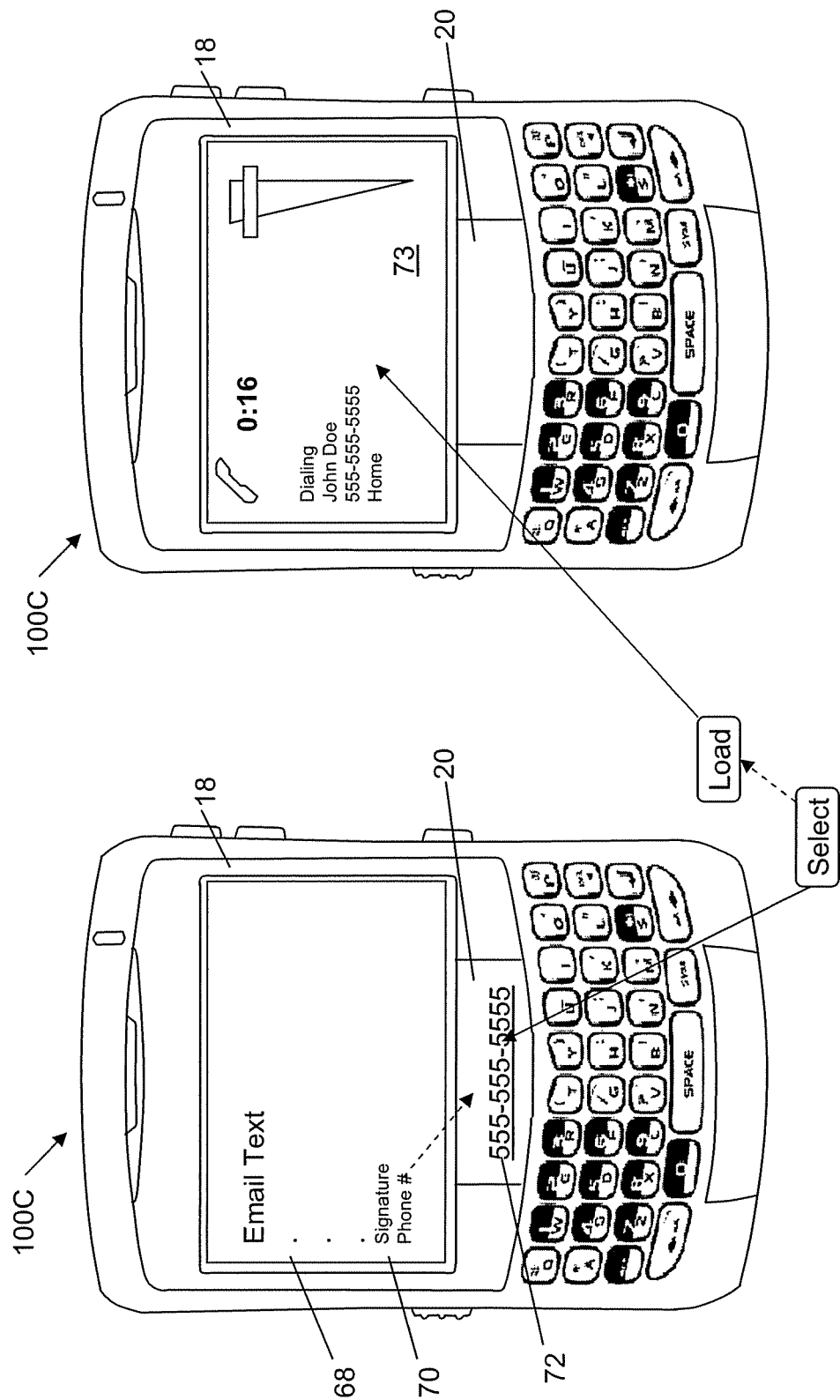

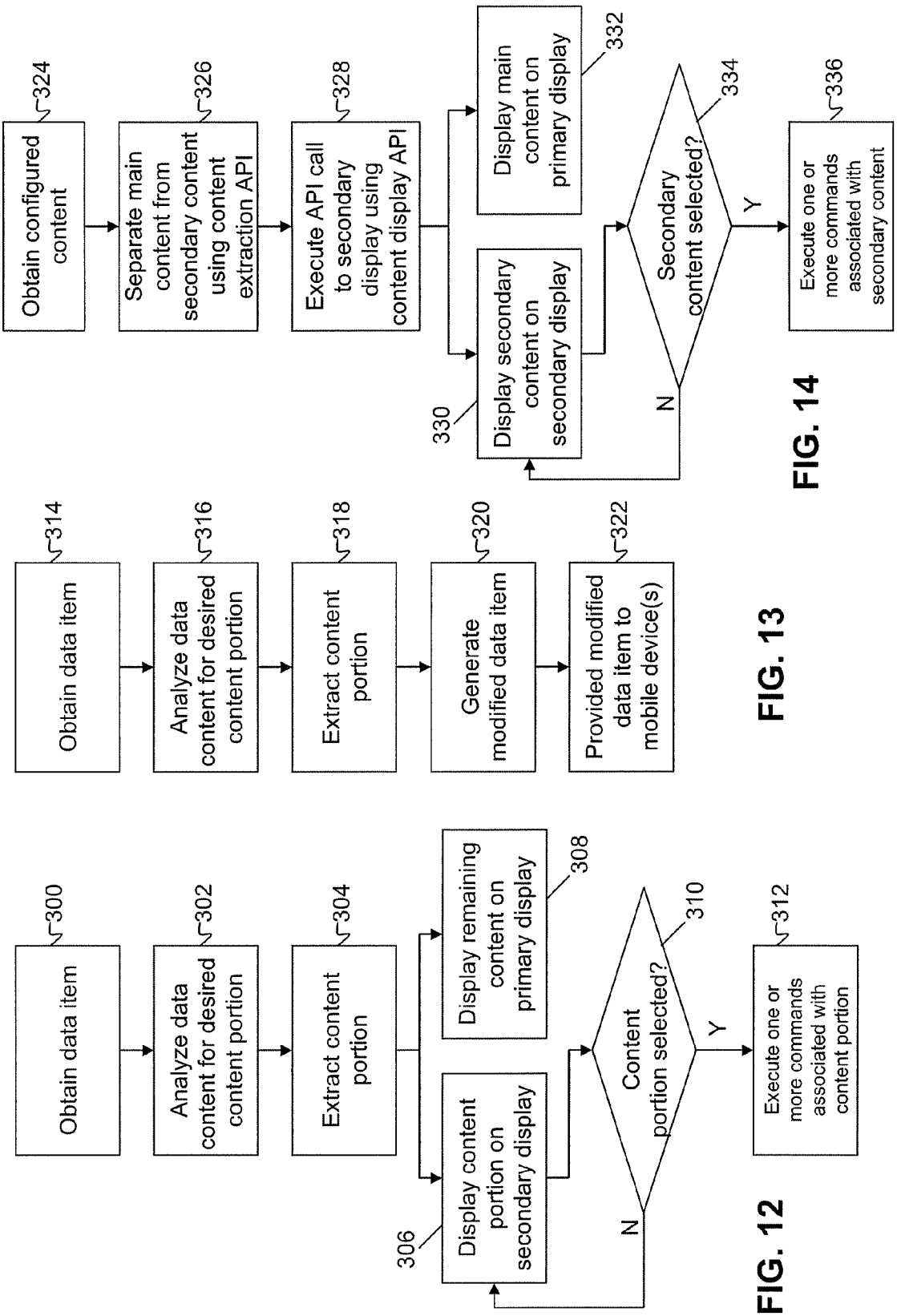

SYSTEM AND METHOD FOR EXTRACTING CONTENT FROM A DATA ITEM TO SEPARATELY DISPLAY PORTIONS OF SUCH DATA

TECHNICAL FIELD

The following relates to systems and methods for extracting content from a data item to separately display portions of such data.

BACKGROUND

Some computing devices, such as portable mobile devices (e.g. hand-held smart phones), face the competing objectives of trying to maximize screen size and maintaining portability. Regardless of which objective is favored in any given device, typically the display screen is relatively small when compared to desktop or otherwise less portable computing devices.

In many cases, relatively small, typically hand-held computing devices having network access, can be used to view the same or similar data and content that would be viewed on a much larger screen, for example, a desktop computer. Such data and content may include items such as logos, advertisements, etc. that consume are large portion of the screen size and can be mixed in with other content, but are not necessarily central to the content being viewed.

BRIEF DESCRIPTION OF THE DRAWINGS

Embodiments will now be described by way of example only with reference to the appended drawings wherein:

FIGS. 7A to 7C illustrate example mobile device configurations for providing primary and secondary displays;

FIG. 8A illustrates a mobile device comprising a single display which displays a banner advertisement with message content;

FIGS. 8B and 8C illustrate example mobile device configurations providing primary and secondary displays, wherein the banner advertisement of FIG. 11A is displayed on the respective secondary display and the message content of FIG. 11A is displayed on the respective primary display;

FIGS. 10A and 10B illustrate a comparison of the presentation of a Buy Now option and other content between a mobile device comprising a single display and a mobile device configuration comprising primary and secondary displays;

FIG. 10C illustrates an example screen shot of a purchase page loaded in response to selection of a Buy Now button displayed on the secondary display in FIG. 10B;

FIG. 11A illustrates an example mobile device configuration providing primary and secondary displays wherein an email message is displayed on the primary display and a telephone number is extracted from the email message and displayed on the secondary display;

FIG. 11B illustrates an example screen shot of a phone application loaded in response to selection of a telephone number displayed on the secondary display in FIG. 11A;

FIG. 12 is a flow chart comprising an example set of computer executable instructions for extracting content from a data item on a mobile device, to separately display portions of such data on primary and secondary displays;

FIG. 13 is a flow chart comprising an example set of computer executable instructions for extracting content from a data item on a server, to generate a modified data item that can be separated for display on primary and secondary displays on a mobile device; and FIG. 14 is a flow chart comprising an example set of computer executable instructions for separating configured content in a data item on a mobile device, to separately display portions of such data on primary and secondary displays using an API call to render content to the secondary display.

DETAILED DESCRIPTION OF THE DRAWINGS

Figure 1:
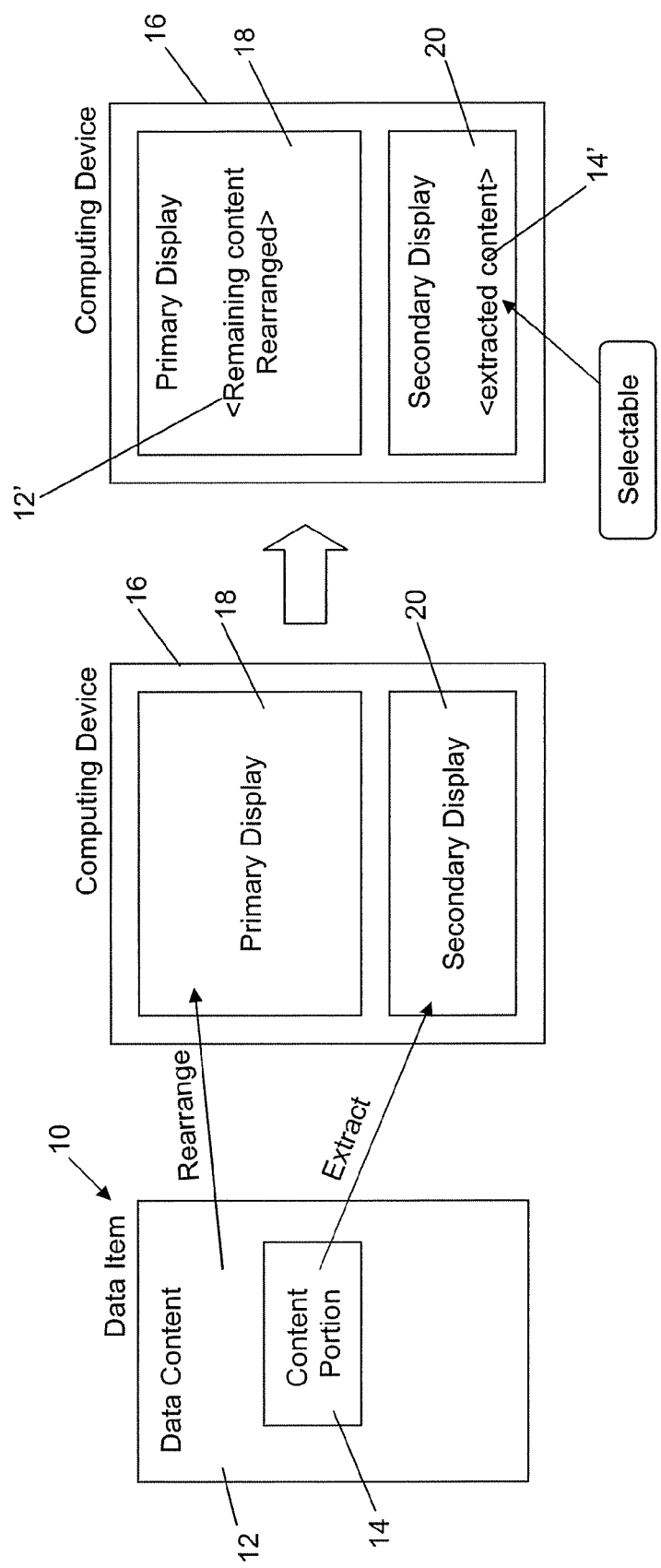
FIG. 1 is a schematic diagram illustrating the extraction of a portion of content from a data item to separately display the content portion on a secondary display of a computing device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

When devices contain more than one display screen, a portion of content from a data item could be extracted from the overall content and separately displayed on a secondary display screen. In some example embodiments, the secondary display screen is an interactive display touch as a touch-sensitive or clickable display that enables interactive content portions to be extracted from the data item and provided separately from the remaining content to both free up space on a primary display screen and maintain visibility of the interactive content, while permitting navigation within the remaining content. Not only does such interactive content become more accessible to the user on the secondary display screen, but particular items can be highlighted to draw the user's attention.

Such extraction of content is particularly advantageous for separating logos (e.g. those used for brand recognition (passive), those providing home page links (active), etc.), advertising, and M-commerce (e.g. "buy now" or "add to cart" buttons). Various secondary displays can be used, such as portions of an existing touch screen, secondary touch screens, portions of an existing clickable screen, secondary clickable screens, and one or more organic light emitting diode (OLED) keys. By using interactive secondary displays, the extracted content item can target interactive content portions that allow easy access to features without having to navigate within the main content each time, thereby truly maximizing the display area in the main screen as wells grabbing the user's attention towards the interactive or non-interactive content in the secondary display.

Turning now to FIG. 1, a data item is generally denoted by numeral 10. The data item 10 may represent any visual type of data, including textual, audio, video, graphical, animations, etc. The data item 10 in this example comprises data content 12 which corresponds to any data considered to be part of the data item 10. It can be appreciated that the data item 10 may be independent or may be part of a larger set of data, for example, a data frame. The data content 12 comprises at least one content portion 14, which corresponds to content that can be extracted to be displayed as extracted content 14' separate from the remaining content 12'. In this example, the remaining content 12' is displayed on a primary display 18 for a computing device 16, and the extracted content 14' is displayed on a secondary display 20 for the computing device 16. As will be discussed below, in some examples, the secondary display 20 is an interactive display that is capable of receiving a user input through interaction directly with the secondary display 20, e.g. touch, click, etc. In this way, by extracting selectable or interactive content portions 14 from the data content 12, the user can select the extracted content 14' by interacting with the secondary display 20. Extracted content 14' can be the same as content portion 14 or can be a rearranged version of content portion 14. As shown in FIG. 1, upon extracting the content portion 14 from the data content 12, when necessary, the remaining content 12' may end up being a rearranged or reconfigured representation of the original data content 12 minus the content portion 14 being extracted. As will be discussed in greater detail below, the analyzing of data items 10 and the extraction of content portions 14 can be done in various configurations including on-device and server-based configurations. In some cases, the content may be pre-formatted by the content provider so that content portion 14 and remaining content from the data content 12 are immediately rendered to the primary and secondary display without additional pre-processing at the server or the device.

Although the principles discussed herein are applicable to any computing device (as shown in FIG. 1), the example embodiments described below generally relate to mobile wireless communication devices, also referred to herein as a mobile device 100, for illustrative purposes only. Examples of applicable communication devices include pagers, cellular phones, cellular smart-phones, wireless organizers, personal digital assistants, computers, laptops, handheld wireless communication devices, wirelessly enabled notebook computers and the like.

The mobile device 100 can be a multi-way communication device with advanced data communication capabilities including the capability to communicate with other mobile devices 100 or computer systems through a network of transceiver stations. The mobile device 100 may also have the capability to allow voice communication. Depending on the functionality provided by the mobile device 100, it may be referred to as a data messaging device, a multi-way pager, a cellular telephone with data messaging capabilities, a wireless Internet appliance, or a data communication device (with or without telephony capabilities).

Figure 2:
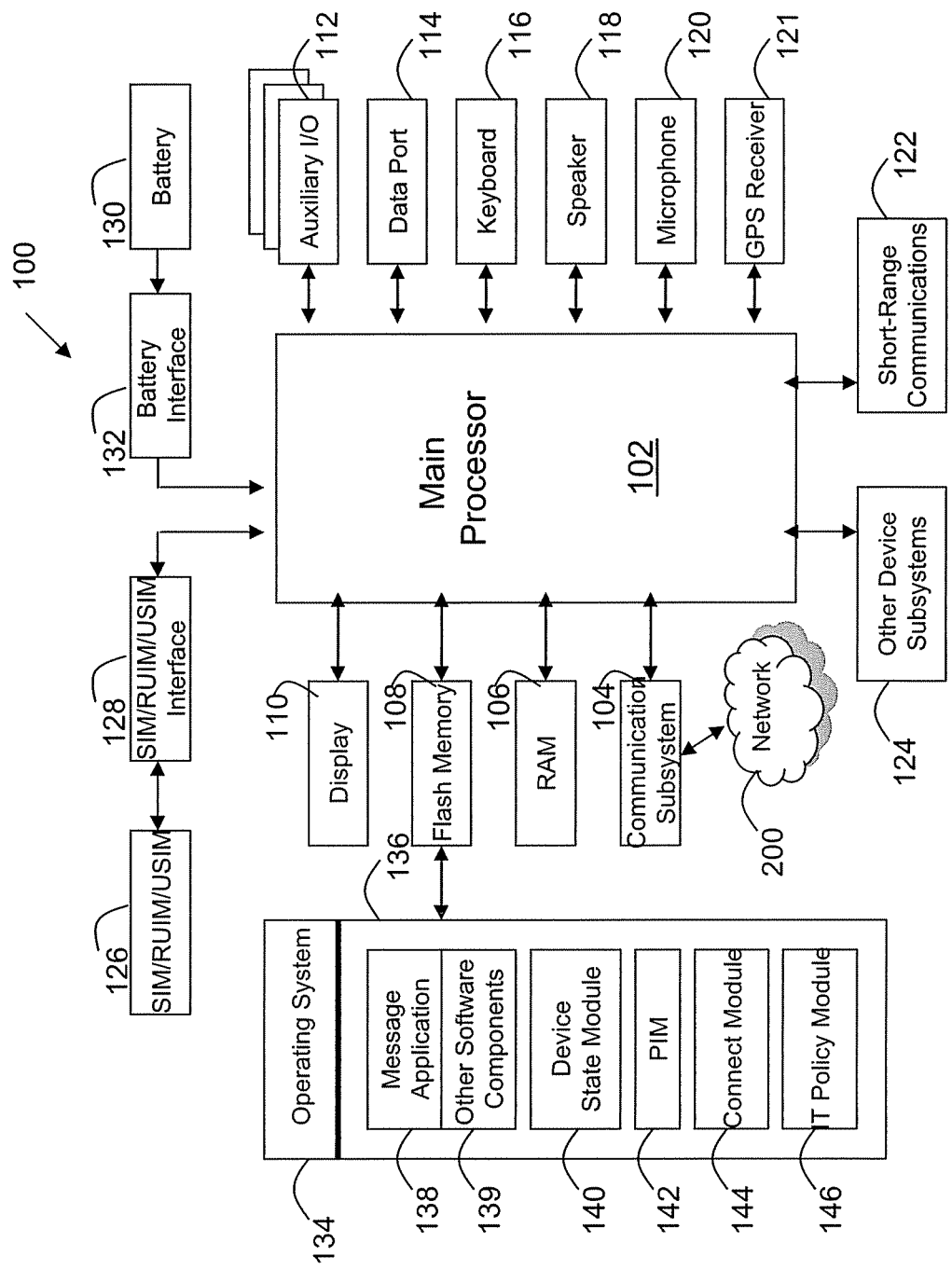
FIG. 2 is a block diagram of an example embodiment of a mobile device.
Figure 3:
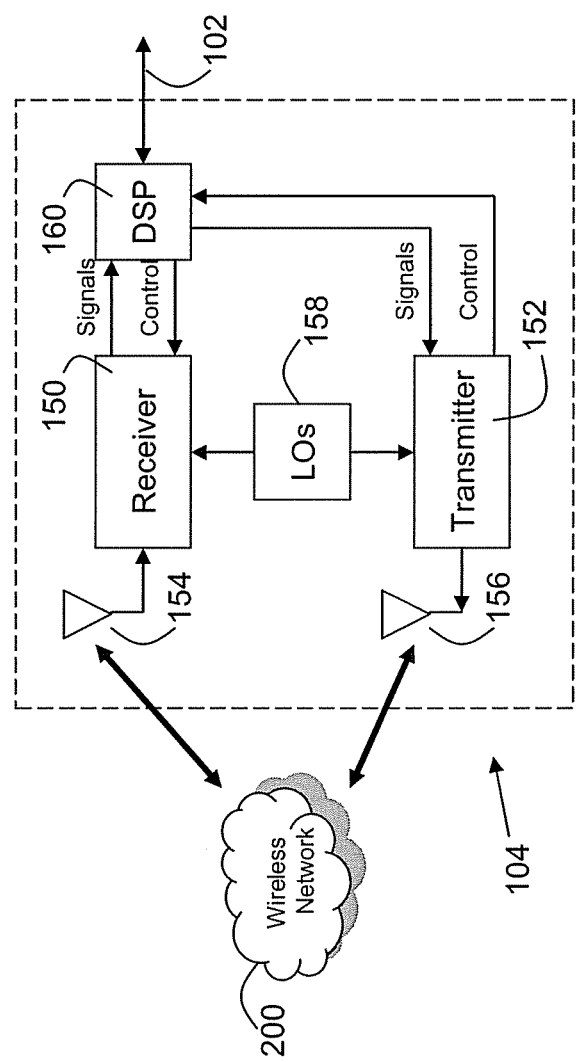
FIG. 3 is a block diagram of an example embodiment of a communication subsystem component of the mobile device of FIG. 3.

An example configuration for a mobile device 100 is illustrated in FIGS. 2-3. Referring first to FIG. 2, shown therein is a block diagram of an example embodiment of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the example embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one example implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, WiMax, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 may be a battery-powered device and, in such cases would include a battery interface 132 for receiving one or more rechargeable batteries 130. In at least some example embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100. It can be appreciated that the mobile device 100 also be a "plugged in" device and thus may not require a battery 130 or battery interface 132 in such configurations.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device 100 to send and receive electronic messages. In addition to the message application 138, the software applications 136 may also comprise various other software components 139, some of which will be describe in greater detail below. Various alternatives exist for the message application 138 as is well known to those skilled in the art. Messages that have been sent or received by the user are typically stored in the flash memory 108 of the mobile device 100 or some other suitable storage element in the mobile device 100. In at least some example embodiments, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an IT policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 5 and 6, which are described in more detail below.

The connect module 144 includes a set of APIs that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some example embodiments, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Referring now to FIG. 3, an example block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 3 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 4:
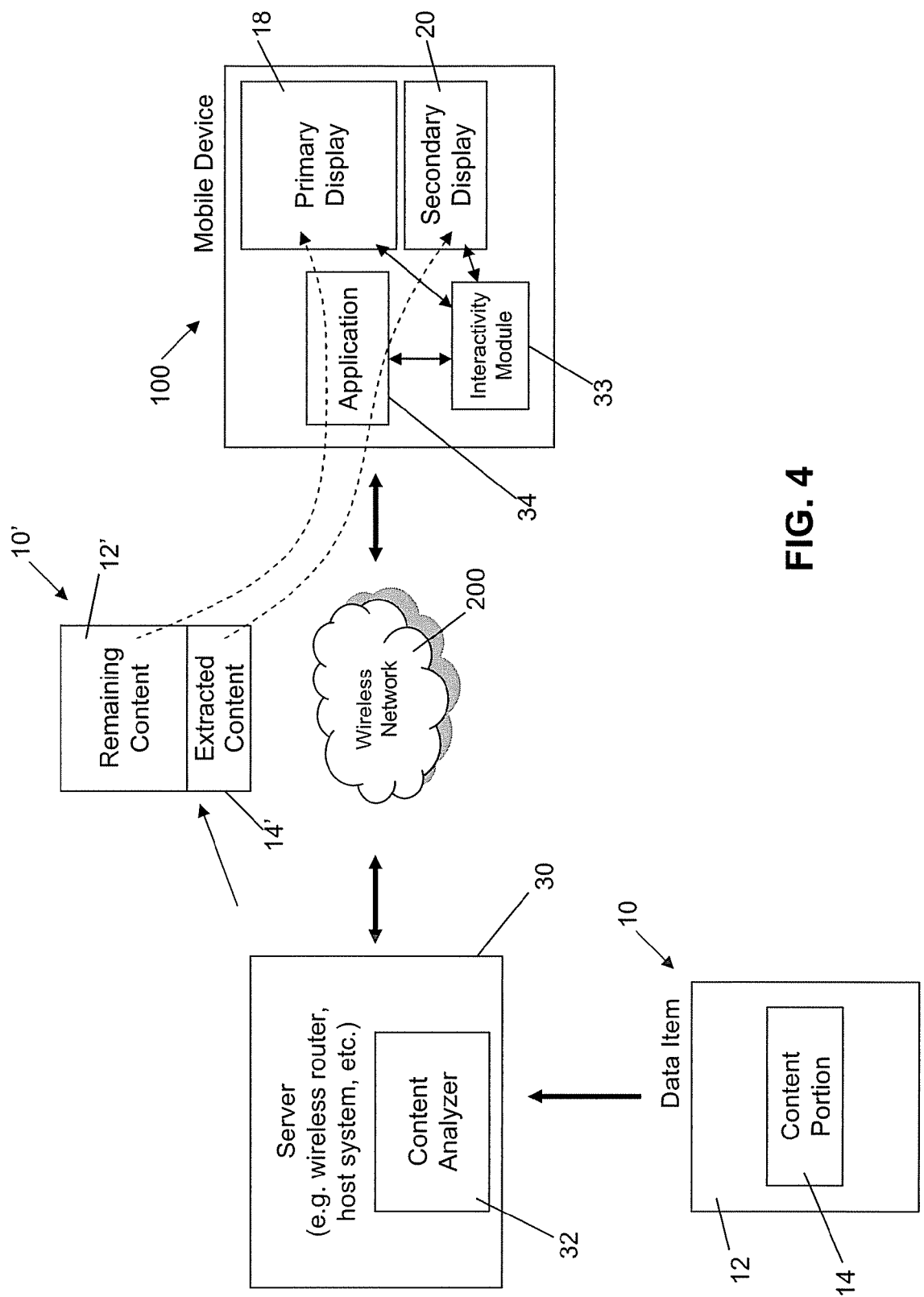
FIG. 4 is a schematic diagram illustrating data item content adaptation on a server prior to delivery to a mobile device.

Turning now to FIG. 4, one example embodiment for extracting content portions 14 from data items 10 for separately displaying the content portion 14 from the remaining content 12' is shown. In this example embodiment, the data items 10 being processed are intended to be sent, received or otherwise handled or processed by a mobile device 100. In this example, the analysing and processing of the data items 10 to enable the content to be separated as illustrated in FIG.

1 is performed by a server 30 that is communicatively connectable to the mobile device, e.g. over the wireless network 200 shown in FIG. 1 or to a proxy-type entity. As such, it can be appreciated that the server's functionality can be provided by existing network components such as the wireless router 26 or the host system 250 described above. For simplicity, any such component or device that operates to analyze and process the data items 10 remotely from the mobile device 100 will be hereinafter referred to as a server device, server component or "server 30" for brevity. The server 30 comprises or otherwise has access to a content analyzer 32 for analyzing and processing data items 10 that the server 30 obtains, e.g. by intercepting data messages or other communications en route to or from a mobile device 100 and intended to be received and viewed or otherwise processed by that or another mobile device 100.

As can be seen in FIG. 4, the content analyzer 32 takes as an input, a data item 10 that comprises data content 12, of which a content portion 14 can be identified, and outputs a modified or reconfigured data item 10' that either separates the extracted content 14' from the remaining content 12' as shown, or otherwise provides instructions (e.g. the required display area dimensions of the extracted content and the primary content, time to display, etc.), data, or information (such as metadata) for enabling an application 34 on the mobile device 100 to separate the data item 10 such that the primary display 18 displays the remaining content 12' and the secondary display 20 displays the extracted content 14'. The content analyzer 32 may also receive various other inputs for determining what constitutes the content portion 14 to be extracted. For example, the content analyzer 32 can be programmed or configured to always extract the same content portion 14 for consistently processed items such as email messages comprising banner advertisements, or can comprise additional intelligence to handle multiple types of data items 10 with varying types of content portions 14. This would allow the content analyzer 32 to first determine the type of data item 10 and, if applicable, reference a set of rules for an identified data item type that dictates what constitutes the content portion 14. Alternatively, or in addition to such a configuration, the content analyzer 32 can examine data items 10 for desired content regardless of the type of data item 10 or medium. For example, icons or logos that provide a home link can be sought whether they are included in a web page, email message, or other document. In another example, the content analyzer 32 can look for recognizable patterns or URIs such as telephone numbers within various types of data items 10 such as email messages, SMS messages, instant messages, etc. to enable the telephone number to constitute the content portion 14. Such an example will be provided in further detail below.

Also shown in FIG. 4 is an interactivity module 33, which may be an existing interactivity module that services interactivity with the mobile device 100. The interactivity module 33 in this example is used with both the primary display 18 and the secondary display 20 to accommodate the interactivity (e.g. touch-sensitive or clickable, keyboard or any combination) of the secondary display 20, wherein the extracted content 14' provides a selectable or interactive component. It may be noted that interaction with content 12' is also possible. The interactivity module 33 is configured to allow interactivity with the secondary display 20 in a manner similar to the way in which it may interact with the primary display 18 and other interactive components such as a keyboard. In this way, user inputs can be detected and acted upon by generating and sending instructions or commands to the application 34, e.g. to load a new screen, web page, different application, etc. It may be noted, however, that while not shown, the interactivity module 33 can correspond to any interaction mechanism available on the device, such as one configured to operate with the keyboard 116, a touch screen (not shown), voice commands, etc.

Figure 5:
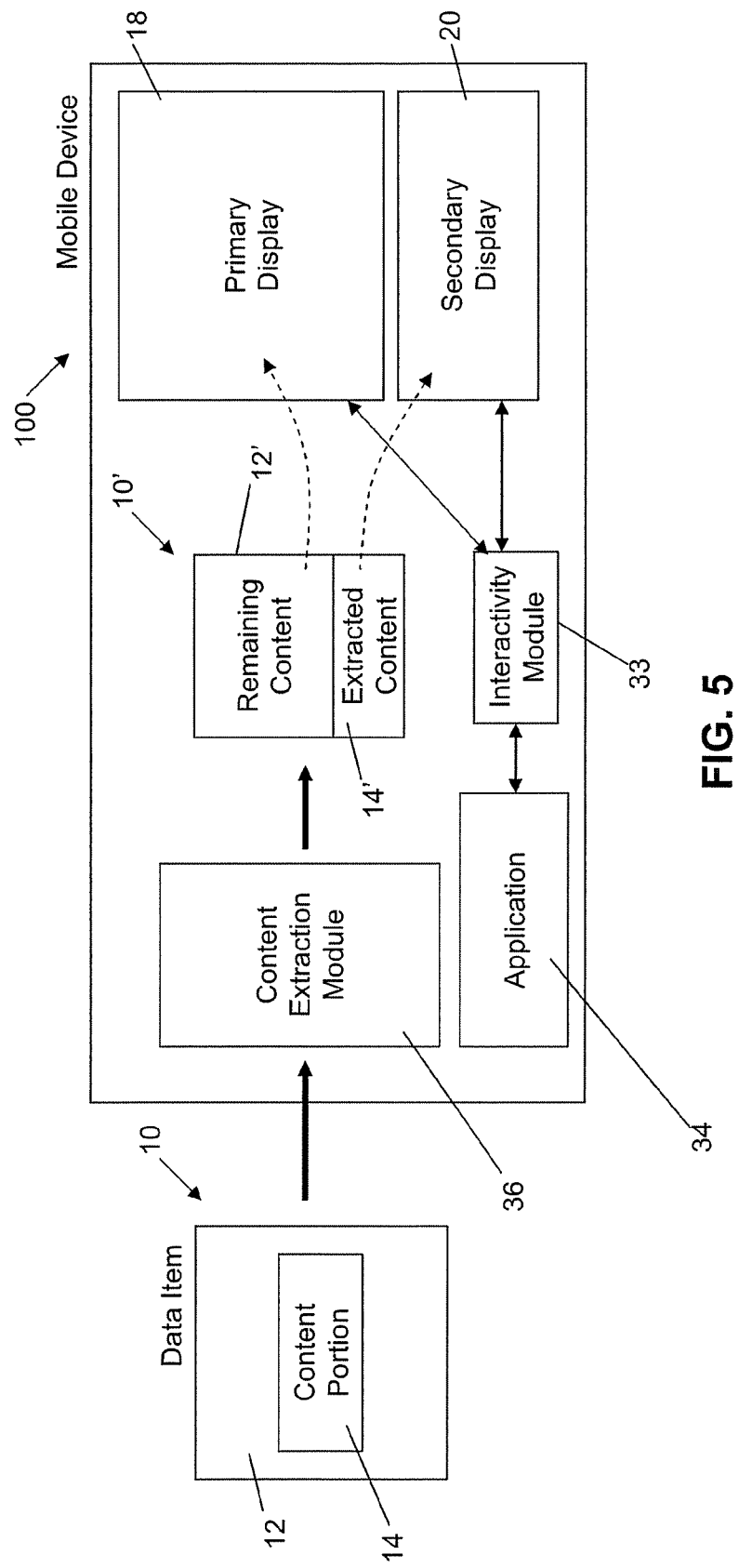
FIG. 5 is a schematic diagram illustrating data item content adaptation on a mobile device.

In situations where a server 30 does not exist, or access to an existing server 30 is not available or desired, the mobile device 100 itself can be configured to analyze and extract the content portion 14 from the data item 10. One example configuration of such an example embodiment is shown in FIG. 5. In FIG. 5 a content extraction module 36 is shown. It can be appreciated that the functionality of the content extraction module 36 should be similar to that of the content analyzer 32 and thus need not be reiterated. However, it may be noted that the content extraction module 36 may be part of an application 34 or may otherwise be in communication with such an application to provide modified data items 10' to the application 34 or to a rendering engine. In other configurations, the application 34 may obtain the data items 10 and pass them to the content extraction module 36 prior to sending any data to the displays 18, 20. Thus the content extraction module 36 can be integrated into or be combined with any application 34 on the mobile device 100 and/or can operate independently to serve multiple applications 34 at the same time. Also shown in FIG. 5 is the interactivity module 33 to monitor interactivity with the primary display 18 and secondary display 20 (and any other interactive component as noted above), which may be configured to operate in a manner similar to that described above and thus details thereof need not be reiterated. As such, similar to that mentioned above, the interactivity module 33 may be one that is already used for the primary display 18.

Figure 6:
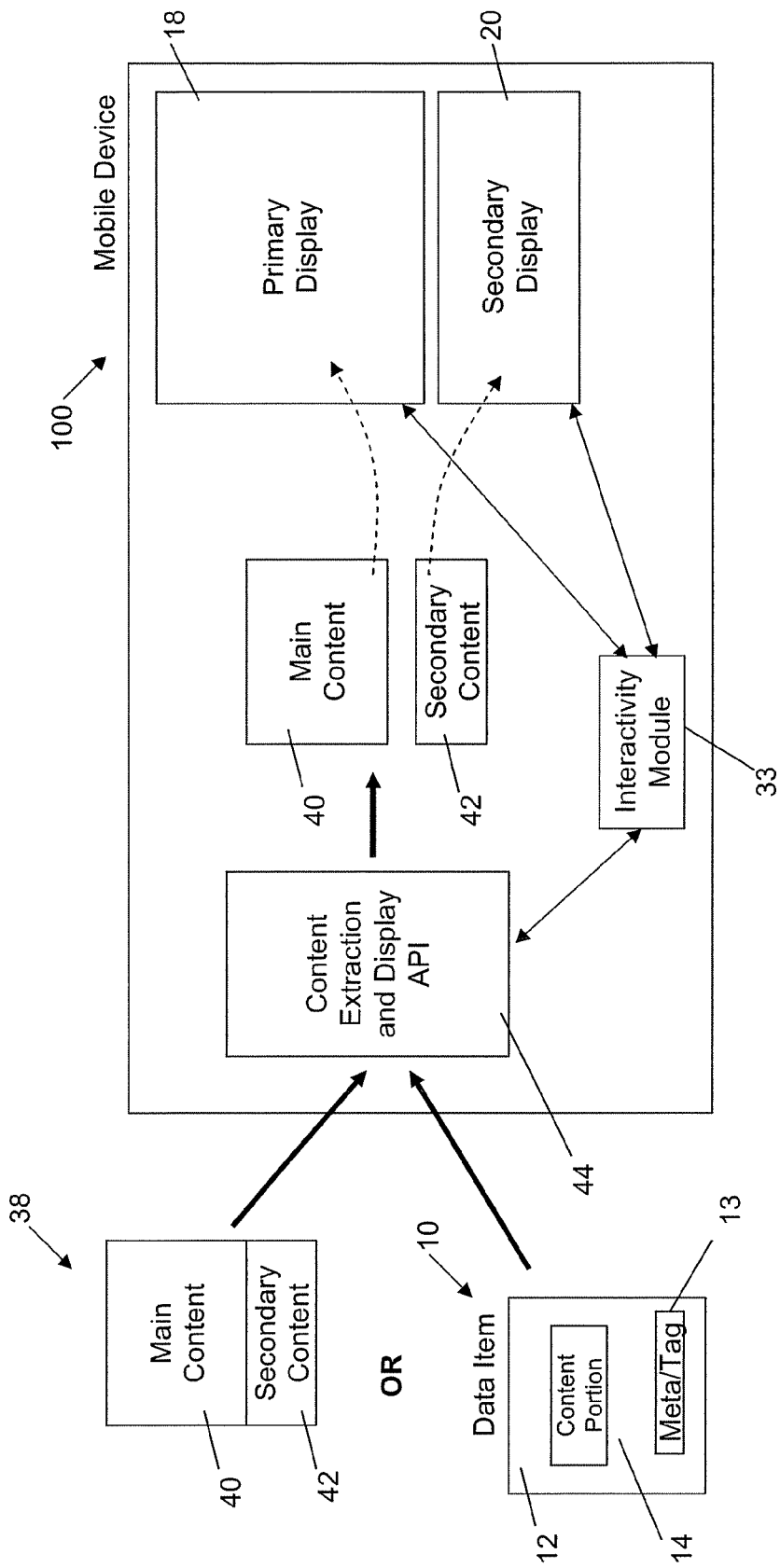
FIG. 6 is a schematic diagram illustrating application programming interface (API) based data item content separation on a mobile device.

A further example embodiment for yet another configuration for separating content onto multiple displays is shown in FIG. 6. In the configuration shown in FIG. 6 it is assumed that the content provider (not shown) has either already configured their provider-specific data items 38 to provide a recognizable separation between main content 40 and secondary content 42, or has added meta data or a tag 13 to the data item 10 to provide instructions regarding where in the data item 10 the content portion 14 to be extracted resides. This may be done to identify the content that belongs to either the primary display 18 or secondary display 20.

The following is an example HTML content with a special tag or attribute to identify the target display area.

```
<HTML>
    <text displaytarget="primary">Hello</text>
    <image src="myimage.png" displayTarget="secondary"/>
</HTML>
```

In particular, the attribute 'displayTarget' identifies the target display to which the associated content shall be displayed. In the above example, the content indicates that the text content shall be displayed on the primary display 18 and the image content shall be displayed on the secondary display 20. The content associated with the image in the above example may be interactive advertisement.

Further, the content provider may provide a content provider-specific content extraction and display API 44 which may be utilized by an application directly or though a library to simply separate the main content 40 from the secondary content 42 using pre-formatted data items 38 or data items 10 comprising the tags or specialized attributes as shown in the above HTML content example. In addition content extraction functionality, the API may further support the ability to directly render the content to the appropriate target displays

18, 20. The main content 40 would then at the same time be displayed on the primary display 18 in the normal manner.

In another example embodiment, an existing tag or metatag 13 as well as the position of the content portion in the data item 10 could be use by the device to determine that this content portion 14 should be displayed on the secondary display 20.

For Example:

```
<html lang="en">
    <head>
    ...
    </head>
    <body>
...
<a href="/mysitecom/en"><img src="/files/resources/image/en/logo.png" id="logo" alt=""></a>
...
    </body>
```

As shown in the example, the logo and associated hyperlink is positioned at the beginning of the body of the HTML page, and is further identified by an ID=logo A device, or an application on a device, such as a web browser, when parsing the content, would identify the content portion 14, that is the logo and render it on the secondary display 20. The associated hyperlink would be mapped to the interaction mechanism associated with the secondary display 20. A script module could be used to parse the tag/metatag 13 and identify the content item to be rendered on the secondary screen 20.

Also shown in FIG. 6 is the interactivity module 33 to monitor interactivity with the primary display 18 and secondary display 20, which may be configured to operate in a manner similar to that described above and thus details thereof need not be reiterated.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 100, or accessible or connectable thereto. Any application or module herein described may be implemented using computer readable/executable instructions that may be stored or otherwise held by such computer readable media.

FIGS. 7A to 7C illustrate three example mobile devices 100A to 100C respectively, to illustrate different ways in which primary and secondary displays 18, 20 can be incorporated into and thus provided by a mobile device 100. In FIG. 7A, a touchscreen-type mobile device 100A is shown which, in part, comprises a touchscreen display 46 enabling touch and/or click-type interactivity. In this example embodiment, the mobile device 100A is configured to separate the display 46 into distinct interactive portions, namely a primary display 18 and a secondary display 20 as shown. In FIG. 7B, the secondary display 20 is a separate clickable or otherwise interactive upper display 47 that is distinct from a regular, non-interactive screen 48 providing the primary display 18.

In FIG. 7C, a regular, non-interactive screen 49 provides the primary display 18, similar to FIG. 7B, however, in this example embodiment, the secondary display 20 is provided by an interactive element 51 such as an OLED key. As is known in the art, an OLED is an LED whose emissive electroluminescent layer is composed of a film of organic compounds. The layer usually contains a polymer substance that allows suitable organic compounds to be deposited. They are deposited in rows and columns onto a flat carrier by a simple "printing" process. The resulting matrix of pixels can emit light of different colors. An OLED key such as the interactive element 48, is a clickable or selectable and thus interactive component that allows a user to select what is displayed on the key. In this way, the content portion 14 can be extracted and displayed on the OLED key as the secondary display 20 according to the principles discussed herein.

FIGS. 8A to 8C illustrate two examples showing the effect separating a banner advertisement (ad) 52 from other message content 54 using the separate display configurations of the mobile devices 100B and 100C discussed above. As can be appreciated from FIG. 8A, in conventional mobile devices 100 that utilize a single display screen 50, the banner ad 52 consumes at least a portion of the display 50 that would otherwise be available to the message content 54. Also, where the message content 54 extends beyond the bottom of the display 50 and requiring user navigation such as scrolling to view additional message content (not shown in FIG. 8A), the banner ad 52 may no longer appear on the display 50 as it would remain at the top of the message content 54. Even if the banner ad 52 is configured to remain at the top of the display 50, there still exists the drawback of consuming space on the display 50 that would otherwise be available to the message content 54. As such, it has been recognized that where a secondary display 20 is available, content such as a banner ad 52 can be extracted from the other content, e.g. the message content 54 and separately displayed. Also, wherein the secondary display 20 is interactive, the banner ad 52 can be made easily available and selectable at any time separate from the interactions with the primary display 20.

In order to provide such separation, an extracted banner ad 52' is displayed on the secondary display 20 as shown in FIGS. 8B and 8C. In FIG. 8B, it can be seen that the extracted banner ad 52' can be displayed on the upper display 47 and the remaining message content 54' can be displayed as usual on the main display 48. Not only does the extracted banner ad 52' not interfere with the remaining message content 54' and the does not consume space that would otherwise be made available for the message content 54', but the extracted banner ad 52' is "set aside" to enable easier access to it for enabling interactivity. In this example, the user can click on the extracted banner ad 52' at any time and either immediately or at some other time (e.g. when the user is finished viewing the remaining message content 54') be directed to other content (not shown) that is associated with the advertisement.

In FIG. 8C, it can be seen that the extracted banner ad 52' can be displayed on the interactive element 51, e.g. using an OLED key for the same purposes as described above with respect to FIG. 8B. It may be noted however that use of an OLED key or similar interactive element 51 can make interacting with the extracted banner ad 52' particularly convenient as it could be treated as a dynamically changing custom button that is comfortably placed close to a keyboard, navigation device (e.g. trackpad, trackwheel, trackball, etc.). It may also be noted that the interactive element 51 can, in some configurations, enable more space for incorporation of the primary display 18, for example if the space available to the primary and secondary displays 18, 20 is the same as that which would be available to a conventional display 50.

Figures 9A, 9B:
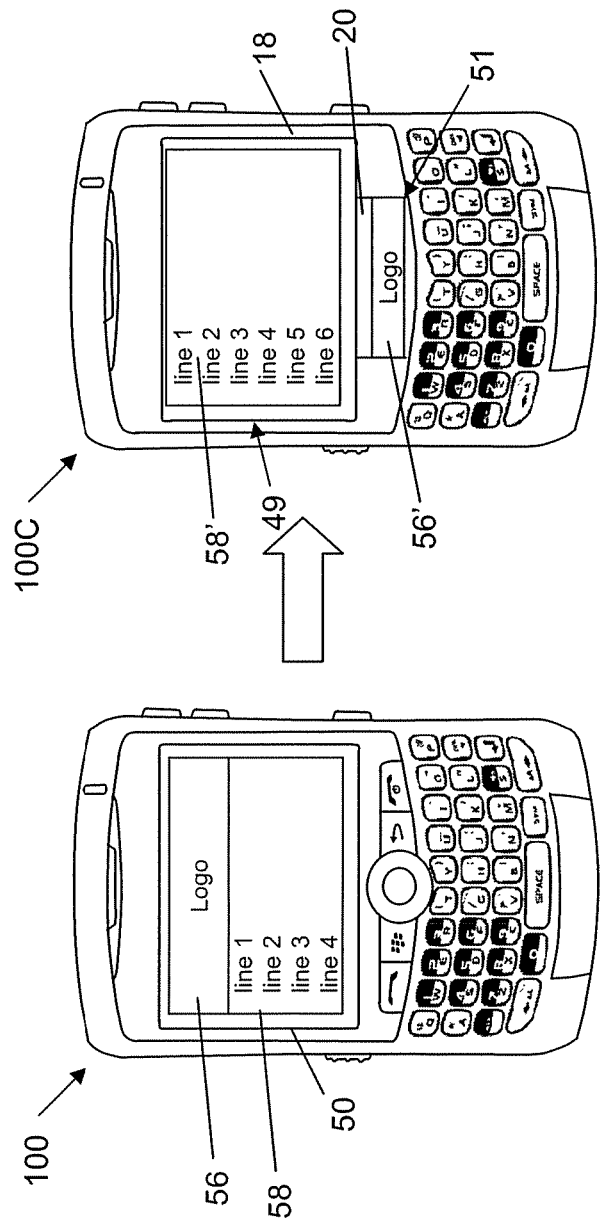
FIGS. 9A and 9B illustrate a comparison of the presentation of a logo and lines of content between a mobile device comprising a single display and a mobile device configuration comprising primary and secondary displays.

FIGS. 9A and 9B illustrate another example showing the effect of separating a content portion 14 from data content 12, in this example wherein the content portion 14 is a logo 56. It can be appreciated that the logo 56 may provide branding, may provide a link such as a home link (e.g. on a newspaper website), or both. In FIG. 9A it can be seen that the logo 56 in this example consumes a significant portion of a conventional display 50 whereby the currently displayed message or data content 58 is restricted. As shown in FIG. 9B, by extracting the logo 56 to generate an extracted logo 56' and displaying the extracted logo 56' on the interactive element 51, the remaining data content 58' may comprise additional content that can be displayed at the same time. In this example, in the conventional mobile device 100, four "lines" of data can be displayed along with the logo 56 whereas using the interactive element 51 to display the extracted logo 56' enables six "lines" of data to be displayed at the same time. It can be appreciated that the term "lines" in this example may represent any unit of measurement indicative of the amount of data that can be displayed on the screen at the same time, e.g. lines of text, number of elements, etc.

Turning now to FIGS. 10A, 10B, and 10C, yet another example illustrating the extraction of a content portion 14 from a data item 10 is shown. In FIG. 10A, it can be seen that mobile commerce (M commerce) items such as a Buy Now button 66, when displayed in an M commerce webpage 60 on a conventional display 50, can consume space that would otherwise enable photos 62 and other details 64 to be shown more clearly. Moreover if scrolling is required to review additional details, the Buy Now button 66 may disappear from the current view and further scrolling would be needed to get back to it. Instead, as shown in FIG. 10B, an extracted Buy Now button 66' can be displayed on the interactive element 51 to enable the remaining content 12' to be enlarged and rearranged. In this example, enlarged photos 62' and a larger portion of content 64' can be displayed to show some details more clearly. It can therefore be appreciated that by extracting a content portion 14 and separately displaying the extracted content 14' on a secondary display 20, not only can additional remaining content 12' be displayed at the same time, but opportunities to rearrange and refocus existing content are possible, which can be suited to the application. At the same time, the extracted Buy Now button 66' is immediately available and thus can be selected at any time the rearranged content is viewed. By selecting the extracted Buy Now button 66' as shown in FIG. 10B, a Purchase Page 67 or other related screen or application can be loaded as shown in FIG. 10C.

FIGS. 11A and 11B provide yet another example illustrating the extraction of a content portion 14 from a data item 10. In this example, the content portion 14 corresponds to a phone number 72 that is extracted from a signature portion 70 of an email message 68. By extracting the phone number 72, the phone number 72 can be displayed on the secondary display 20 independent of the email message 68 and thus be immediately available to the user in the event that, based on the content of the message 68, the user wishes to contact the sender immediately. In this way, should the user select the phone number 72 from the secondary display 20 as shown in FIG. 11A, a phone application 73 can be immediately loaded and a call dialled as shown by way of example in FIG. 11B, to immediately begin a call with the sender of the email message 68.

It can be appreciated that other communication links can be extracted instead of a phone number 72 or can be displayed based on the phone number 72. For example, a link to a new SMS message can be displayed based on the phone number 72 extracted or by referencing contact information for the sender. In another example, an instant messaging session could be launched from a suitable link displayed on the secondary display 20. Such links can be extracted according to user preferences or user selectable options, or can be embedded in the email message 68 (or equivalent medium carrying the information) such that the option to communicably link to the sender is imposed on the recipient. It can be appreciated that various communication links and various rules for which type of link to be used can be implemented based on the application.

Turning now to FIG. 12, an example set of computer executable instructions is shown for extracting content portions 14 from data items 10 on a mobile device 100. At 300, the data item 10 is obtained, e.g. a message is received via a data communications system such as that accessible via the network 200. The data item 10 thus received may then be analyzed by the content extraction module 36 for a desired content portion 14 at 302 and the content portion 14 (assuming it can be found) extracted at 304. The extracted content 14' may then be displayed on the secondary display 20 at 306 and the remaining content 12' displayed on the primary display 18 at 308. In this example, it is assumed that the extracted content 14' provides an interactive and selectable element that allows the user to carry out additional operations associated with the extracted content 14'. Under this assumption, the interactivity module 33 can be used to monitor user interactivity with the secondary display 20 at 310. If the extracted content portion 14' has not been selected via the secondary display 20, control may return to 306. If the extracted content portion 14' has been selected at 310, the interactivity module 33 can either trigger the application 34 or itself generate commands that can be executed to perform an operation associated with the content portion 14 at 312.

FIG. 13 provides an example set of computer executable instructions is shown for extracting content portions 14 from data items 10 on a server 30. At 314 the data item 10 is obtained, e.g. a message is intercepted via a data communications system. The data item 10 thus obtained may then be analyzed by the content analyzer 32 for a desired content portion 14 at 316 and the content portion 14 (assuming it can be found) extracted at 318. A modified data item 10' is then generated at 320 and the modified data item 10' provided (e.g. sent as a message or other communication) to one or more mobile devices 100 at 322.

FIG. 14 provides an example set of computer executable instructions is shown for extracting content portions 14 from data items 10 on a mobile device 100 when the content has been pre-configured by a content provider. As such, it can be appreciated that the operations performed in FIG. 14 can be considered a special case of those performed in FIG. 12. At 324, the configured content 38 or data item 10 comprising a tag 13 is obtained, e.g. a message is received via a data communications system. The configured content 38 or data item 10 with tag 13 thus received may then be processed by the content extraction API portion of module 44 at 326 to separate the secondary content 42 (assuming it can be found) from the main content 40. The content display API portion of the module 44 would then perform an API call to display the extracted content (i.e. based on the specialized meta data) to the appropriate displays, namely the primary display 18 the secondary display 20 in order to utilize the secondary display 20 to separately display the secondary content 42. The secondary content 42 may then be displayed on the secondary display 20 at 330 and the main content 40 displayed on the primary display 18 at 332. In this example, it is assumed that the secondary content 42 provides an interactive and selectable element that allows the user to carry out additional operations associated with the secondary content 42. Under this assumption, the interactivity module 33 can be used to monitor user interactivity with the secondary display 20 at 334. If the secondary content 42 has not been selected via the secondary display 20, control may return to 330. If the secondary content 42 has been selected at 334, the interactivity module 33 can either trigger the content provider API 44 or itself generate commands that can be executed to perform an operation associated with the secondary content 42 at 336.

The steps or operations in the flow charts described herein are just for example. There may be many variations to these steps or operations without departing from the spirit of the invention. For instance, the steps may be performed in a differing order, or steps may be added, deleted, or modified.

Although the above has been described with reference to certain specific example embodiments, various modifications thereof will be apparent to those skilled in the art without departing from the scope of the claims appended hereto.

The invention claimed is:

1. A method of displaying content on a mobile device, the method comprising:
   obtaining a data item, the data item comprising two or more content portions, the two or more content portions including an interactive content portion associated with meta data or a tag which indicates where in the data item the interactive content portion can be found for automatic extraction, the interactive content portion configured to, when selected via an input mechanism of the mobile device, cause the mobile device to execute one or more commands associated with the interactive content portion, wherein all the content portions of the data item are configured to be displayed together;
   automatically extracting the interactive content portion from the data item using the meta data or the tag in the data item, thereby providing remaining content from the data item;
   displaying the remaining content of the data item, without the interactive content portion, on a primary display device of the mobile device;
   displaying the interactive content portion, without the remaining content of the data item, on an interactive secondary display device of the mobile device;
   after detecting interaction with the interactive content portion available at the interactive secondary display device, executing the one or more commands associated with the interactive content portion; and
   updating at least one of the primary and the interactive secondary display devices with new content in response to the interaction with the interactive content portion available at the interactive secondary display device.

2. The method according to claim 1, further comprising analyzing the data item upon receipt thereof to determine the interactive content portion to be displayed on the interactive secondary display device.

3. The method according to claim 2, wherein the interactive content portion is any one of a logo, a banner advertisement, and a telephone number providing a link to a phone application, and a communication identifier providing a link to a communication application.

4. The method according to claim 1, wherein the data item has been pre-configured by a content provider to delineate the data item into primary content corresponding to the remaining content and secondary content corresponding to the interactive content portion, wherein the extracting the content portion comprises separating the secondary content from the primary content, and wherein displaying the interactive content portion comprises executing an application programming interface call from a content provider application to utilize the interactive secondary display.

5. The method according to claim 1 wherein the interactive content portion is a telephone number and after detecting interaction with the telephone number on the interactive secondary display device, updating the primary display device to show a phone application configured to dial the telephone number.

6. The method according to claim 1 wherein the interactive content portion is an advertisement and after detecting interaction with the advertisement on the interactive secondary display device, updating the primary display device to show the new content related to the advertisement.

7. The method according to claim 1 wherein the interactive content portion is a communication identifier and after detecting interaction with the advertisement on the interactive secondary display device, updating the primary display device to show a messaging application associated with the communication identifier.

8. The method according to claim 1, after extracting the interactive content portion, further comprising reconfiguring the remaining content of the data item for display on the primary display device.

9. The method according to claim 1 wherein the remaining content of the data item comprises an image and the method further comprises, after extracting the interactive content portion, enlarging the image for display on the primary display device.

10. A mobile device comprising a primary display device, an interactive secondary display device, a processor, one or more input mechanisms and a memory, the memory comprising computer executable instructions for:
    obtaining a data item, the data item comprising two or more content portions, the two or more content portions including an interactive content portion associated with meta data or a tag which indicates where in the data item the interactive content portion can be found for automatic extraction, the interactive content portion configured to, when selected via one of the one or more input mechanisms, cause the processor to execute one or more commands associated with the interactive content portion;
    automatically extracting the interactive content portion from the data item using the meta data or the tag in the data item, thereby providing remaining content from the data item;
    displaying the remaining content of the data item, without the interactive content portion, on the primary display device;
    displaying the interactive content portion, without the remaining content of the data item, on the interactive secondary display device;
    after detecting interaction with the interactive content portion available at the interactive secondary display device, executing the one or more commands associated with the interactive content portion; and
    updating at least one of the primary and the interactive secondary display devices with new content in response to the interaction with the interactive content portion available at the interactive secondary display device.

11. The mobile device according to claim 10, further comprising instructions for analyzing the data item upon receipt thereof to determine the interactive content portions to be displayed on the interactive secondary display device.

12. The mobile device according to claim 11, wherein the content portion is any one of a logo, a banner advertisement, and a telephone number providing a link to a phone application.

13. The mobile device according to claim 10, wherein the data item has been pre-configured by a content provider to delineate the data item into primary content corresponding to the remaining content and secondary content corresponding to the interactive content portion, wherein the extracting the interactive content portion comprises separating the secondary content from the primary content, and wherein displaying the interactive content portion comprises executing an application programming interface call from a content provider application to utilize the interactive secondary display.

14. The mobile device according to claim 10 wherein the interactive content portion is a telephone number and the computer executable instructions further comprise: after detecting interaction with the telephone number on the interactive secondary display device, updating the primary display device to show a phone application configured to dial the telephone number.

15. The mobile device according to claim 10 wherein the interactive content portion is an advertisement and the computer executable instructions further comprise: after detecting interaction with the advertisement on the interactive secondary display device, updating the primary display device to show the new content related to the advertisement.

16. The mobile device according to claim 10 wherein the interactive content portion is a communication identifier and the computer executable instructions further comprise: after detecting interaction with the advertisement on the interactive secondary display device, updating the primary display device to show a messaging application associated with the communication identifier.

17. The mobile device according to claim 10 wherein the computer executable instructions further comprise: after extracting the interactive content portion, reconfiguring the remaining content of the data item for display on the primary display device.

18. The mobile device according to claim 10 wherein the remaining content of the data item comprises an image and the computer executable instructions further comprise: after extracting the interactive content portion, enlarging the image for display on the primary display device.

19. A method of providing data items to mobile devices, the method comprising:
a server device obtaining a data item, the data item comprising at least one interactive content portion associated with meta data or a tag which indicates where in the data item the interactive content portion can be found for automatic extraction, the interactive content portion configured to, when selected via an input mechanism on a mobile device, cause the mobile device to execute one or more commands associated with the interactive content portion;
the server device analyzing the data item, using the metadata or the tag in the data item, to determine a desired interactive content portion to be extracted;
the server device generating a modified data item delineating extracted content corresponding to the desired interactive content portion from remaining content from the data item; and
the server device providing the modified data item to one or more mobile devices each comprising a primary display device and an interactive secondary display device;
wherein the modified data item is configured to be processed to display the remaining content on the primary display device of the respective mobile device and to display the desired interactive content portion on the interactive secondary display device of the mobile device without the remaining content of the data item, such that after detecting selection of the desired interactive content portion via the interactive secondary display device, the one or more commands associated with the desired interactive content portion are executed and are configured to update at least one of the primary display device and the interactive secondary display device with new content.

20. The method according to claim 19, wherein the content portion is any one of a logo, a banner advertisement, and a telephone number providing a link to a phone application.

21. The method according to claim 19, wherein the data item has been pre-configured by a content provider to delineate the data item into primary content corresponding to the remaining content and secondary content corresponding to the content portion, wherein the extracting the content portion comprises separating the secondary content from the primary content.

22. The method according to claim 19, wherein the content portion comprises a communication identifier providing a link to a communication application.

23. A server device comprising a processor configured for analyzing content in data items for providing the data items to mobile devices, the server device further comprising a memory comprising computer executable instructions for causing the processor to:
obtain a data item, the data item comprising at least one interactive content portion associated with meta data or a tag which indicates where in the data item the interactive content portion can be found for automatic extraction, the interactive content portion configured to, when selected via an input mechanism on a mobile device, cause the mobile device to execute one or more commands associated with the content portion;
analyze the data item, using the metadata or the tag in the data item, to determine a desired interactive content portion to be extracted;
generate a modified data item delineating extracted content corresponding to the desired interactive content portion from remaining content from the data item; and
provide the modified data item to one or more mobile devices each comprising a primary display device and an interactive secondary display device; wherein the modified data item is configured to be processed to display the remaining content on the primary display device of the respective mobile device and to display the desired interactive content portion on the interactive secondary display device of the mobile device without the remaining content of the data item, such that after detecting selection of the desired interactive content portion via the interactive secondary display device, the one or more commands associated with the desired interactive content portion are executed and are configured to update at least one of the primary display device and the interactive secondary display device with new content.

24. The server device according to claim 23, wherein the content portion is any one of a logo, a banner advertisement, and a telephone number providing a link to a phone application.

25. The server device according to claim 23, wherein the data item has been pre-configured by a content provider to delineate the data item into primary content corresponding to the remaining content and secondary content corresponding to the content portion, wherein the extracting the content portion comprises separating the secondary content from the primary content.

26. The server device according to claim 23, wherein the content portion comprises a communication identifier providing a link to a communication application.

* * * * *